J. I. LOGAN.
VALVE.
APPLICATION FILED MAY 29, 1916.

1,316,585.

Patented Sept. 23, 1919.

INVENTOR.
John I. Logan
BY Barnes & Truman
ATTORNEYS.

UNITED STATES PATENT OFFICE.

JOHN I. LOGAN, OF CHICAGO, ILLINOIS, ASSIGNOR TO INDUSTRIAL APPLIANCE COMPANY, A CORPORATION OF WEST VIRGINIA.

VALVE.

1,316,585.  Specification of Letters Patent.  Patented Sept. 23, 1919.

Application filed May 29, 1916. Serial No. 100,578.

*To all whom it may concern:*

Be it known that I, JOHN I. LOGAN, a citizen of the United States, residing at Chicago, in the county of Cook and State of Illinois, have invented certain new and useful Improvements in Valves, of which the following is a specification.

My invention relates to a valve, and more particularly to a valve suitable for controlling the flow of gas in apparatus for maturing and bleaching flour. Difficulties have been experienced in providing a valve suitable for use in apparatus of this sort because of the corrosive character of the gas employed which will soon destroy the packing ordinarily employed in valves and because of the necessity of obtaining a very minute and accurate regulation of the gas in order that the treatment of the flour should be uniform.

The object of my invention is to provide a valve which shall meet all the requirements imposed upon it when employed as part of a flour maturing and bleaching apparatus, and the invention consists in the novel arrangements, constructions and devices to be hereinafter described and claimed for carrying out this object.

The invention is illustrated, in a preferred embodiment, in the accompanying drawing wherein—

Figure 1:
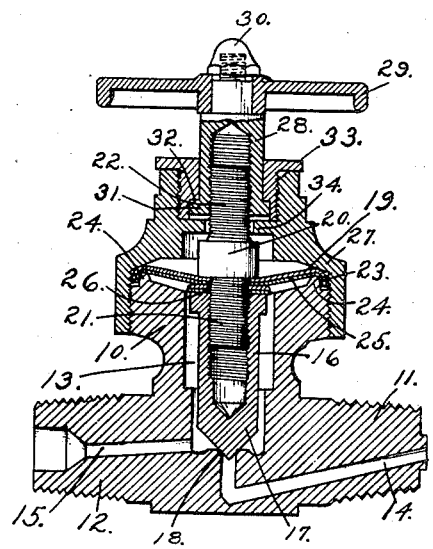
Figure 2:
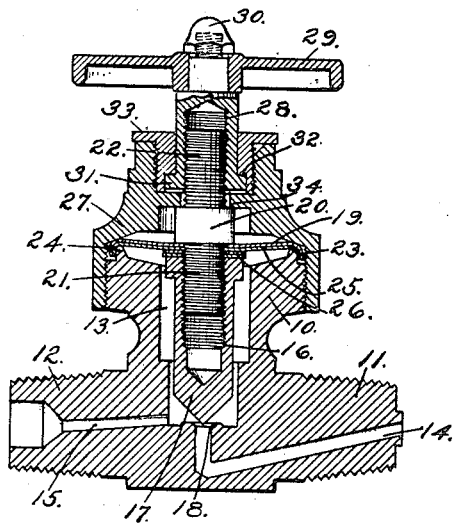

Figure 1 is a longitudinal section of the valve with the valve member seated, and Fig. 2, a similar view showing the valve member moved away from its seat.

Like characters of reference indicate like parts in both figures of the drawing.

Referring to the drawing, 10 is a valve casing formed with threaded bosses 11, 12, by means of which the device is interposed in the pipe system of the maturing and bleaching apparatus. The casing is hollow, providing a valve chamber 13. 14 is an inlet port leading to chamber 13 and 15 an outlet port leading therefrom. The valve member 16 has a cone-shaped end 17 adapted to project into port 14 and bear against the valve seat 18. The valve member is internally threaded and is secured to a metallic, preferably steel diaphragm 19 by means of a connecting piece 20 formed with a threaded stud 21 extending into the threaded opening in the valve member and an oppositely projecting threaded stud 22. The edge of the diaphragm 19 is formed with a circumferential flange 23 extending over a boss 24 formed on the upper edge of the casing 10. The steel diaphragm 19 is provided with a non-corrodible covering, on the side exposed to the gas, which covering consists preferably of a silver diaphragm 25. A washer 26 with a rounded edge is interposed between the diaphragms and the valve member. The diaphragms are held in clamped relation with the casing 10 by a bonnet 27 which is screwed upon the casing. 28 is an internally threaded spindle provided with a hand grip 29 secured to the spindle by a nut 30. The spindle is provided on its inner end with a boss 31 which engages a shoulder 32 formed on a gland 33 which is screwed into a threaded opening in the outer end of the bonnet 27. 34 is a rib on the inside of the bonnet which forms a stop for the connecting member 20 so as to limit the outward movement of the valve.

The diaphragm 19 serves two functions. It prevents the escape of gas around the spindle, doing away with the necessity of packing. The gases used for the maturing and bleaching of flour, for example, chlorin gas or nitrosyl chlorid gas, or mixtures of the two, will soon corrode and disintegrate the materials ordinarily used for packing valves. In the second place, the diaphragm which is made relatively stiff, supports the valve member, taking up any looseness which there may be between the threading of the spindle and the stud on the valve engaged thereby, besides accurately centering the valve member, which is rigidly attached to the diaphragm, with respect to the port which it controls. In an apparatus of this character very minute and accurate control of the gas is essential. The gas is employed in relatively small quantities mixed with large quantities of air. If the proper proportions are not accurately maintained the flour will be either under-treated on the one hand, or, on the other, over-treated and spoiled. The steel diaphragm 19 gives the valve support the necessary stiffness and elasticity. Steel, however, is readily attacked by the gas. The silver diaphragm will not be corroded to any appreciable extent. Its function is to protect the steel diaphragm.

The diaphragms are relatively small in diameter so that if flexed to too great an extent they are liable to breakage. To prevent this the outward movement of the valve body is limited by stop 34.

It is realized that minor changes in the form and construction of the valve might be made without departure from the invention.

I claim:

1. In a valve, the combination with a casing providing a chamber, inlet and outlet ports and a valve seat; of a valve member in said chamber; a steel diaphragm extending across said chamber, with its edge in clamped relation with the casing, to which said valve member is attached; a silver diaphragm on the side of the steel diaphragm exposed to the gas; and means for moving said valve member to and from its seat.

2. In a valve, the combination with a casing providing a chamber, inlet and outlet ports and a valve seat; of a valve member in said chamber, a composite metal diaphragm having a silver protective facing on the side exposed to the valve ports to which said valve member is rigidly secured, a bonnet which holds the edge of said diaphragm in clamped relation with the casing and which is provided with a stop rib, a threaded stud secured to said valve member and formed to provide a shoulder adapted to engage said stop rib, an internally threaded spindle engaging said stud and provided with a hand grip, and a gland interposed between said bonnet and spindle in which the spindle is revoluble without capacity for appreciable longitudinal movement.

3. In a valve, the combination with a casing providing a chamber, inlet and outlet ports and a valve seat; of a valve member in said chamber, a steel diaphragm to which said valve member is rigidly secured, a silver diaphragm on the side of said steel diaphragm exposed to the gas, a bonnet which holds the edges of said diaphragms in clamping relation with the casing and which is provided with a stop rib; a threaded stud secured to said valve member and formed to provide a shoulder adapted to engage said stop rib, an internally threaded spindle engaging said stud and provided with a hand grip, and a gland interposed between said bonnet and spindle in which the spindle is revoluble without capacity for appreciable longitudinal movement.

4. In a valve, the combination with a casing providing a chamber, inlet and outlet ports and a valve seat, of a valve member in said chamber, a composite diaphragm extending across said chamber with its edge secured within said casing to which said valve member is attached, said diaphragm comprising a steel element and a silver element protecting said steel element on the side exposed to the valve ports, means for moving said valve member from its seat, and means for limiting the unseating movement of the valve member to prevent distortion of the diaphragm.

JOHN I. LOGAN.